United States Patent
Kronestedt et al.

(12) 
(10) Patent No.: US 6,310,866 B1
(45) Date of Patent: Oct. 30, 2001

(54) MEDIUM ACCESS CONTROL PROTOCOL WITH AUTOMATIC FREQUENCY ASSIGNMENT

(75) Inventors: Fredric Kronestedt, Stockholm; Göran Malmgren, Hägersten; Lennart Nilsson, Onsala, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/169,141

(22) Filed: Oct. 9, 1998

(51) Int. Cl.[7] ........................................... H04Q 7/00
(52) U.S. Cl. ............................................... 370/330
(58) Field of Search ................................. 370/330, 278, 370/280, 282, 294, 304, 312, 314, 328, 329, 332, 333, 336, 337, 338, 341, 345, 347, 349, 350, 356, 353; 455/507, 517, 515, 522, 524, 526, 68, 71, 575

(56) References Cited

U.S. PATENT DOCUMENTS

| | | | |
|---|---|---|---|
| 5,355,514 | 10/1994 | Borg | 455/423 |
| 5,778,318 | 7/1998 | Talarmo et al. | 455/452 |
| 5,805,581 | 9/1998 | Uchida et al. | 370/335 |
| 5,956,642 | * 12/2000 | Larsson et al. | 455/449 |
| 6,052,594 | * 4/2000 | Chuang et al. | 455/450 |
| 6,061,389 | * 5/2000 | Ishifuji et al. | 375/133 |
| 6,094,426 | * 7/2000 | Honkasalo et al. | 370/331 |
| 6,167,031 | * 12/2000 | Olofsson et al. | 370/252 |

FOREIGN PATENT DOCUMENTS

| | | |
|---|---|---|
| 0 530 165 A2 | 3/1993 | (EP) . |
| WO 92/10886 | 6/1992 | (WO) . |

OTHER PUBLICATIONS

M. Almgren et al., "Slow Adaptive Channel Allocation for Automatic Frequency Planning", 1996, pp. 260–264.

* cited by examiner

*Primary Examiner*—Dang Ton
*Assistant Examiner*—Phirin Sam
(74) *Attorney, Agent, or Firm*—Burns, Doane, Swecker & Mathis, L.L.P.

(57) ABSTRACT

A medium access control (MAC) protocol for use in a wireless network, that efficiently supports automatic and timely frequency assignment. The MAC protocol accomplishes this by providing periodic "quiet intervals". During these intervals, all transmissions in a corresponding broadcast region are halted, thereby enabling the base station controlling the broadcast region to measure interference over a number of potential frequency carriers. The interference measurements can then be used by an automatic frequency assignment algorithm to reassign frequencies, if necessary, to the various base stations which make up the wireless network. When a base station is reassigned a new frequency, the MAC protocol also provides a period during which the base station can tune to a newly assigned frequency, and thereafter, a period during which the wireless terminals associated with the base station synchronize themselves to the base station and the generation of MAC frames over the newly assigned frequency.

21 Claims, 4 Drawing Sheets

MEDIUM ACCESS CONTROL PROTOCOL WITH AUTOMATIC FREQUENCY ASSIGNMENT

FIELD OF INVENTION

The present invention relates to wireless telecommunications systems. More particularly, the present invention relates to a method for accomplishing interference measurements and for synchronizing a base station with one or more wireless terminals during an automatic frequency assignment procedure.

BACKGROUND

In a wireless telecommunications system, such as a wireless local area network (LAN), telecommunications data is transported between a base station (i.e., an access point) and one or more wireless terminals located in a broadcast region associated with the base station. The telecommunications data that is transported between the base station and the one or more wireless terminals located in the broadcast region associated with the base station is, of course, transmitted in accordance with a particular telecommunications data protocol. One relatively well-known telecommunications protocol is the medium access control (MAC) protocol. The MAC protocol, as will be described in greater detail below, provides a time division multiple access, time division duplex (TDMA/TDD) frame structure, which comprises a downlink portion and an uplink portion. The downlink and uplink portions are, in turn, subdivided into a number of physical channels or time slots. By assigning each of the one or more wireless terminals associated with a base station to a particular time slot, in the downlink and to a particular time slot in the uplink, the base station can communicate with each of the one or more wireless terminals over a single frequency carrier that has been assigned to that base station. The use of a MAC protocol in a wireless LAN is also known. For instance, the European Telecommunications Standardization Institute (ETSI) has decided to employ a MAC protocol as the standard for the High Performance Local Area Network Type Two (Hiperlan Type 2).

In a wireless LAN, assigning and/or reassigning a frequency to each of the base stations in the network is a very important process. It is of particular importance that the frequencies be assigned in such a manner that the interference being experienced is at an acceptable level The process of assigning frequencies is especially complicated, however, with indoor networks such as Hiperlan 2, where the propagation environment is somewhat unpredictable. Further complicating matters is the fact that interference levels tend to increase dramatically as new base stations and wireless terminals are added to an expanding network. These and other complexities associated with the assignment of frequencies in indoor networks, such as Hiperlan 2, have led to the development of automatic frequency assignment techniques.

A significant amount of work has, in fact, been done with developing automatic frequency assignment algorithms. See, for example, Almgren et al., "*Slow Adaptive Channel Allocation for Automatic Frequency Planning*", Proceedings of the IEEE 5th ICUPC, 1996. In accordance with conventional automatic frequency assignment algorithms, it is necessary to first characterize the propagation environment, for instance, periodically measure the radio interference levels associated with the various frequencies that may be assigned to a base station. A typical algorithm then uses the interference measurement information to assign and/or reassign a frequency to the various base stations in the network in such a way that interference is minimized and signal quality is maximized.

There are a number of problems associated with making interference level measurements, particularly in wireless LANs. For example, in a wireless LAN such as a Hiperlan 2 based network, the wireless terminals are receiving information from their corresponding base station (e.g., downloading internet information) far more than they are transmitting information up to the base station. Accordingly, a vast majority of the information and data traffic is concentrated over the downlink portion of each MAC frame. Therefore, the remaining portion of each MAC frame, which is set aside for uplink purposes, is relatively small, and it is, in general, an insufficient period of time to make the necessary interference measurements. One solution to this problem has been to use a receive antenna which is exclusively dedicated to making interference measurements. However, as one skilled in the art will appreciate, a dedicated receive antenna has to be physically separated from the antenna being used to transmit and receive ordinary telecommunications traffic between the base station and the wireless terminals in the corresponding broadcast region by as much as 1 meter. Such an option is generally unattractive both from a physical and a cost point of view.

In addition to the problems associated with making interference measurements, there are problems associated with synchronizing the base station with the one or more wireless terminals during an automatic frequency exchange (i.e., an automatic frequency reassignment procedure). When a base station exchanges its present frequency carrier for another frequency carrier, presumably one experiencing less interference, there is always a risk that the wireless terminals operating in the corresponding broadcast region will not receive and/or process the synchronization and control information that precedes the exchange. Consequently, the communications link between the base station and the wireless terminals may be severed. Conventional wireless networks attempt to avoid this problem by accomplishing automatic frequency assignments when the broadcast region is "empty", that is, when the base station is not communicating with any wireless terminals. The problem with waiting until the broadcast region is empty is that it may take a long period of time before a new frequency can be assigned. During this period, the bases station and the corresponding wireless terminals may have to operate over an undesirable frequency channel that is subject to an unacceptably high level of interference.

SUMMARY OF THE INVENTION

The present invention addresses the above-identified problems by providing a medium access control (MAC) protocol for use in wireless local area networks (LAN) such as Hiperlan 2, that efficiently supports an automatic and timely frequency assignment. In general, the present invention accomplishes this by pre-establishing periodic "quiet intervals", during which downlink transmissions are halted and interference measurements are performed. In addition to pre-establishing these periodic quite-intervals, the MAC protocol of the present provides a predefined period for synchronizing the base station and the various wireless terminals during automatic frequency exchange, to prevent the inadvertent disconnection of a communication link between the base station and the one or more wireless terminals in the corresponding broadcast region.

Accordingly, it is an object of the present invention to provide a MAC protocol, for use in a wireless LAN, which facilitates automatic frequency assignment.

It is another object of the present invention to provide a MAC protocol for use in a wireless LAN that effectively facilitates the taking of interference measurements needed to support automatic frequency assignment.

It is still another object of the present invention to provide a MAC protocol for use in a wireless LAN that effectively accommodates the synchronization of a base station and one or more wireless terminals operating in the broadcast region controlled by the base station during automatic frequency assignment.

In accordance with one aspect of the present invention, the above-identified and other objects are achieved by a medium access control (MAC) protocol for use in a wireless telecommunications network that includes a base station and a wireless terminal. The medium access control protocol includes means for generating MAC frames over a first frequency. The MAC frames contain telecommunications data and control information being transmitted between the base station and the wireless terminal. The MAC protocol also includes means for generating a control message from the base station to the wireless terminal in a downlink portion of a MAC frame. The control message indicates that the base station and the wireless terminal will be prevented from transmitting following the generation of a first number of MAC frames. Once the first number of MAC frames have been generated, the protocol includes means for preventing the base station and the wireless terminal from transmitting during a predefined time interval. In addition, the MAC protocol includes means for generating a second number of MAC frames after the expiration of the predefined time interval wherein the MAC frames contain no user data, and wherein the wireless terminal resynchronizes with the base station while the second number of MAC frames are generated; and means for resuming the generation of MAC frames containing telecommunications data and control information following the generation of the predetermined number of empty MAC frames.

In accordance with another aspect of the present invention, the above-identified and other objects are achieved by a method for accomplishing automatic frequency assignment in a wireless telecommunications network that includes a base station and a wireless terminal, wherein the base station and the wireless terminal communicate in accordance with a medium access control (MAC) protocol. The method first involves generating MAC frames over a first frequency, wherein the MAC frames contain telecommunications data and control information being transmitted between the base station and the wireless terminal. The method then involves generating a control message from the base station to the wireless terminal in a downlink portion of a MAC frame indicating that the base station and the wireless terminal will be prevented from transmitting following the generation of a first number of MAC frames. Next a determination is made as to whether the first number of MAC frames has been generated. Then once it has been determined that the first number of MAC frames has been generated, the base station and the wireless terminal are prevented from transmitting during a predefined time interval. Then after the expiration of the predefined time interval, a second number of MAC frames is generated, wherein the MAC frames contain no user data, and wherein the wireless terminal resynchronizes with the base station while the second number of MAC frames are generated. A determination is then made as to whether the second number of empty MAC frames has been generated. Once that determination has been made, he method resumes with generation of MAC frames containing telecommunications data and control information.

In accordance with yet another aspect of the present invention, the above-identified and other objects are achieved by a method for automatic frequency assignment in a wireless local area network that includes a base station and at least one wireless terminal, wherein the base station and the at least one wireless terminal communicate in accordance with a medium access control (MAC) protocol. This method also involves generating MAC frames over a first frequency, wherein the MAC frames contain telecommunications data and control information being transmitted between the base station and the at least one wireless terminal. The method then involves broadcasting an interference measurement pause control message from the base station to the at least one wireless terminal in a downlink portion of a MAC frame, wherein the interference measurement pause control message warns the at least one wireless terminal that following the generation of a first number of MAC frames the base station will begin making interference measurements for at least one frequency. A determination is then made as to whether the first number of MAC frames has been generated. After determining that the first number of MAC frames has been generated, all base station and wireless terminal transmissions are terminated for a predefined time interval. The base station then measures interference for the at least one frequency during the predefined time interval. A determination is then made as to whether the predefined time interval has elapsed, and after determining that the predefined time interval has elapsed, the interference measurements being made at the base station are terminated and a second number of MAC frames are generated, wherein each of the second number of MAC frames contains no user data. While the second number of MAC frames are being generated, the at least one wireless terminal is able to synchronize with the base station. A determination is then made as to whether all of the second number of empty MAC frames have been generated, and after determining that all of the second number of empty MAC frames have been generated, there is a resumption in the generation of MAC frames containing telecommunications data and control information over the first frequency. Finally, a new frequency is assigned to the base station in place of the first frequency, based on the interference measurements.

BRIEF DESCRIPTION OF THE DRAWINGS

The objects and advantages of the invention will be understood by reading the following detailed description in conjunction with the drawings in which.

DETAILED DESCRIPTION OF THE INVENTION

For a better understanding of the invention the following detailed description refers to the accompanying drawings, wherein exemplary embodiments of the present invention are illustrated and described. In the figures, reference numbers are used to identify key features of the invention. These reference numbers appearing in the drawings are used consistently throughout the description.

The present invention involves wireless local area networks (LAN) such as the High Performance Local Area Network Two (Hiperlan 2). More specifically, the present invention involves a wireless LAN that transmits and receives telecommunications data and control information in accordance with a medium access control (MAC) protocol wherein the MAC protocol facilitates the execution of an automatic frequency assignment algorithm. In general, the MAC protocol accomplishes this by effectively accommodating the interference measurements that are needed to support the automatic frequency assignment algorithm, despite the fact that an overwhelming percentage of each MAC frame is set aside for downlink purposes. The MAC protocol also effectively accommodates the synchronization of a base station to each of the wireless terminals associated with that base station during an automatic frequency assignment procedure.

Figure 1:
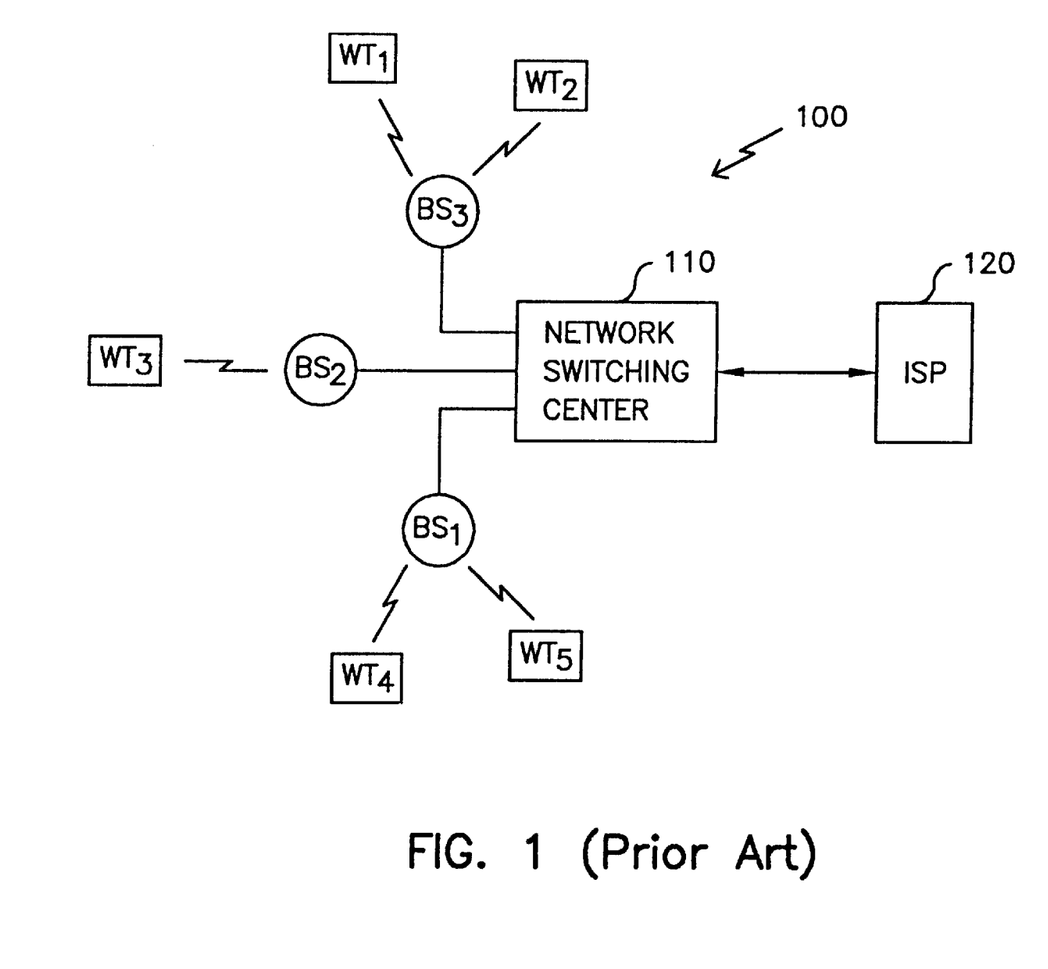
FIG. 1 illustrates the basic configuration of an exemplary wireless local area network.

FIG. 1 illustrates an exemplary wireless network 100. As shown, the wireless network 100 includes a network switching center 110, which communicates with each of a number of base stations BS1, BS2 and BS3. The network switching center 110 also communicates with devices that are external to the wireless network 100. For example, the network switching center 110 is shown as communicating with an internet service provider 120 over a public switch telephone network (PSTN) line. Each of the base stations BS1, BS2 and BS3, in turn, may communicate with a number of wireless terminals, such as WT1–WT6, over a radio (i.e., wireless) interface. As one skilled in the art will understand, each of the base stations BS1, BS2 and BS3 control a particular broadcast region (not shown), and that each wireless terminal associated with a given base station is located in the broadcast region corresponding to that base station. In a wireless LAN, such as Hiperlan 2, which is intended primarily for indoor use, each broadcast region may, for example, represent a different floor in a single building.

In order that they may communicate, the various network base stations and the corresponding wireless terminals associated with each base station must transmit and receive the telecommunications data and control information in accordance with a telecommunications protocol. The telecommunications protocol, of course, defines the rules which dictate, for example, how the telecommunications data and control information is formatted, when a base station must transmit and when it must receive, and when each of the wireless terminals must transmit and when each must receive. The MAC protocol is an example of a telecommunications protocol that has been employed with wireless LANs, including the Hiperlan 2.

Figure 2:
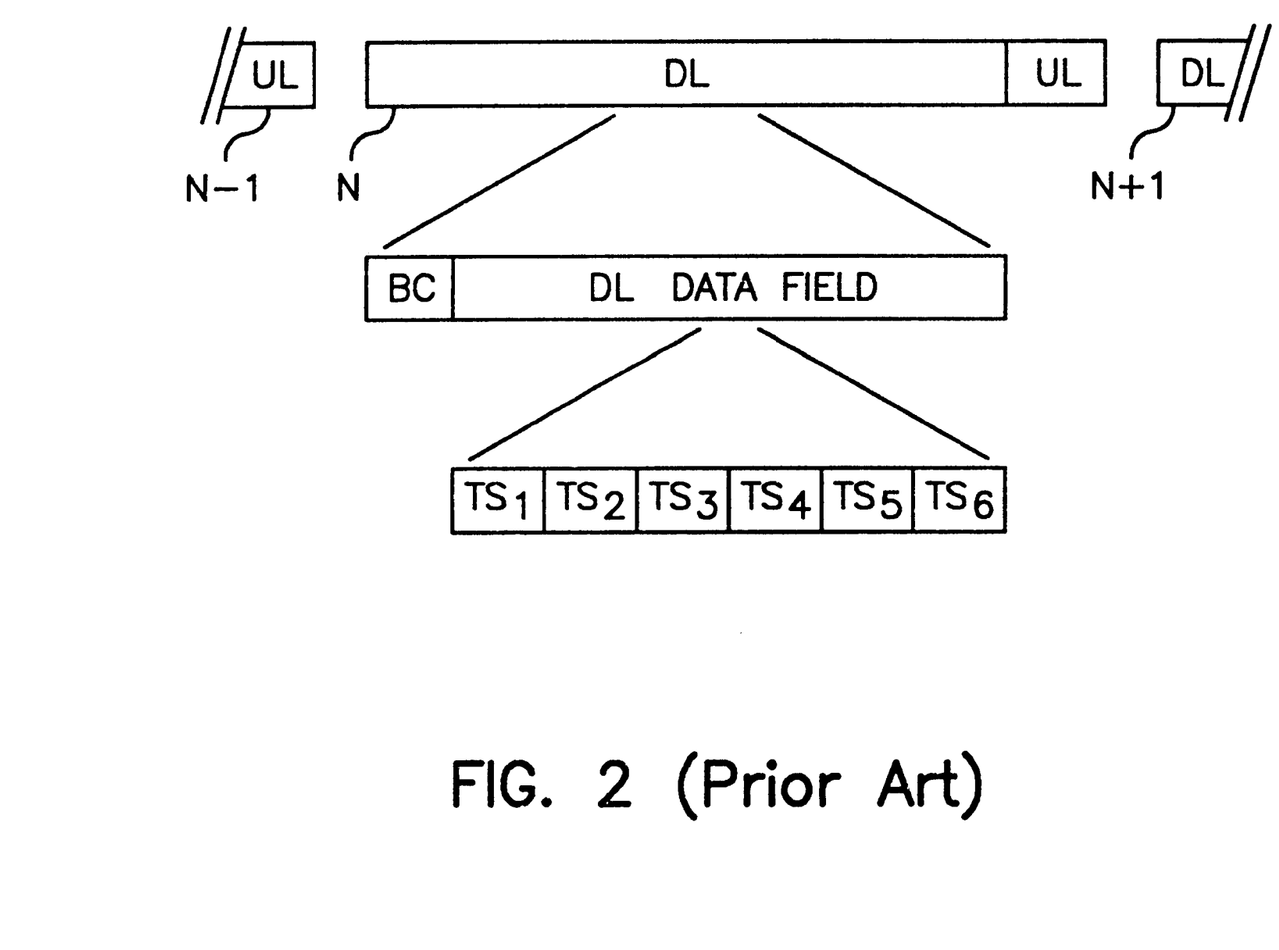
FIG. 2 illustrates the general structure of a medium access control protocol frame.

FIG. 2 illustrates a sequence of exemplary MAC protocol frames N−1, N and N+1. As shown, for example in the MAC frame N, each MAC frame comprises a downlink portion DL and an uplink portion UL. During the downlink portion DL, the base station is transmitting and one or more of the wireless terminals associated with that base station are receiving. In contrast, during the uplink portion UL, one or more of the wireless terminals are transmitting, while the base station is receiving. FIG. 2 also illustrates that the downlink portion DL includes a broadcast field BC and a downlink data field, wherein the broadcast field BC is generally used by the base station to transmit control messages to the various wireless terminals located in the corresponding broadcast region.

As the MAC protocol is a time division multiple access, time division duplex (TDMA/TDD) based protocol, the downlink data field is divided into a number of time slots, for example, time slots $TS_1$–$TS_6$. As one skilled in the art will readily appreciate, by assigning one or more of the wireless terminals associated with a given base station to one or more time slots, the base station can effectively communicate with multiple wireless terminals simultaneously, over a single frequency channel (i.e., frequency carrier). It will also be understood, though it is not illustrated in FIG. 2, that the uplink portion of the MAC frame includes an uplink data field, which in turn, is divided into a number of uplink time slots. However, of greater significance is the fact that the uplink portion of the MAC frame is relatively small as compared to the downlink portion. That is because in an indoor wireless LAN, such as Hiperlan 2, the wireless terminals are typically computer terminals, which spend a great deal of time receiving large quantities of data, such as internet data, over the downlink, and relatively little time transmitting data over the uplink.

Referring back to FIG. 1, each of the base stations BS1, BS2 and BS3 are assigned a frequency by a network operations and maintenance function, preferably through the execution of an automatic frequency assignment algorithm. As explained previously, in order to effectively and automatically assign a frequency to each base station, such that overall network interference levels are minimized, while overall signal quality is maximized, it is necessary to periodically measure the interference levels associated with each of the frequencies that could potentially be assigned to a base station. In conventional wireless LANs, particularly indoor networks like Hiperlan 2, performing these interference measurements is difficult because a base station cannot practically make these measurements while simultaneously transmitting during the downlink portion of each MAC frame, and although the base station could measure interference during the uplink portion of each MAC frame, the time allotted for the uplink is so small that there is, for all practical purposes, an insufficient period of time to complete those measurements. The MAC protocol of the present invention overcomes this dilemma by providing a periodic pause in the transmission of telecommunications data between a base station and the wireless terminals associated with the base station. During this pause, the base station is able to make the interference measurements that are necessary to support an automatic frequency assignment algorithm.

Figure 3:
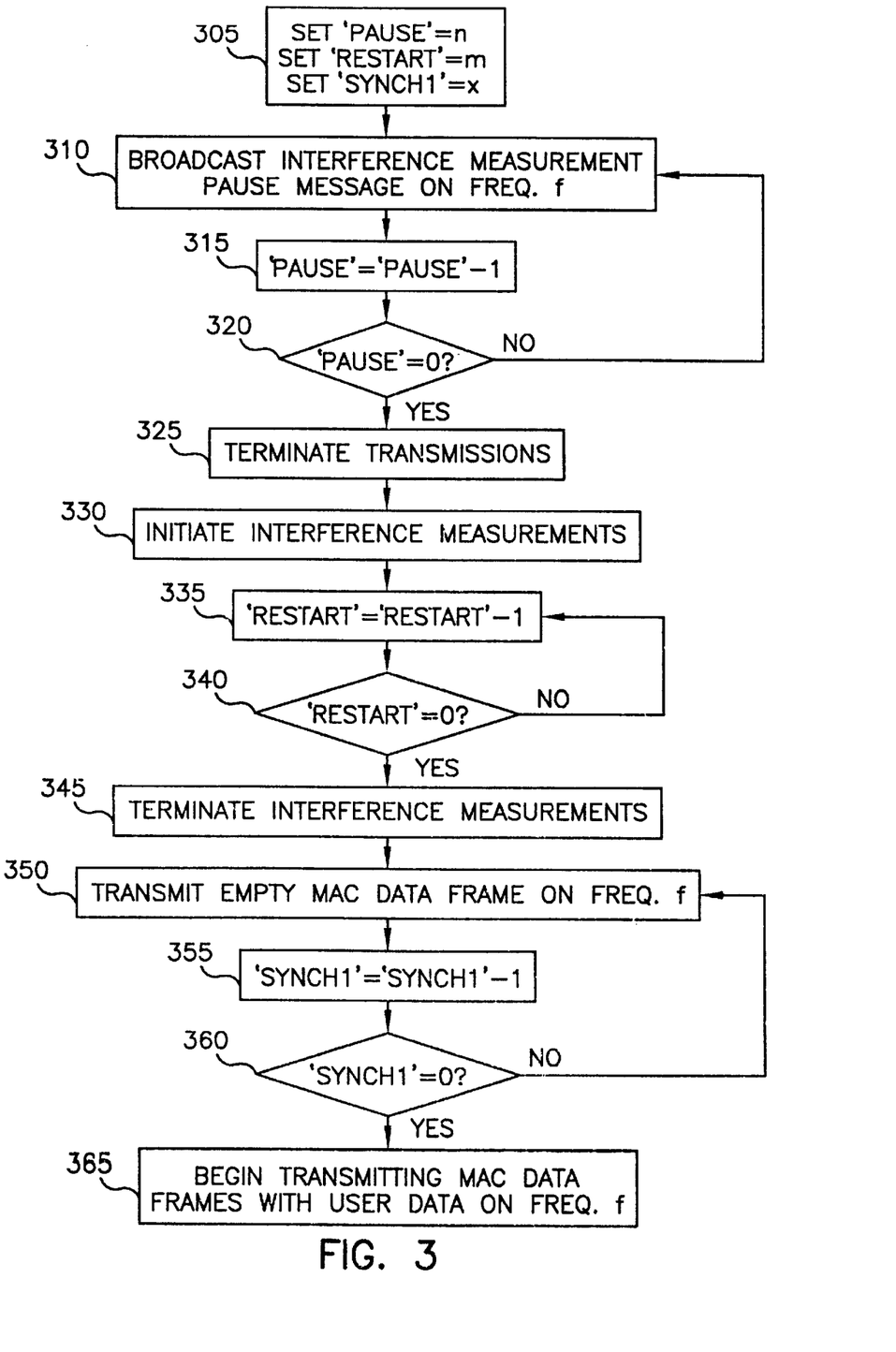
FIG. 3 is a flow diagram depicting a technique that facilitates interference measurements in a wireless local area network that employs a medium access control protocol in accordance with the present invention.

FIG. 3 illustrates an exemplary technique, in accordance with the present invention, wherein the MAC protocol provides for a pause in the transmission of telecommunications data and control information between a base station and its corresponding wireless terminals, and wherein the base station can make the interference measurements needed to support the automatic frequency assignment algorithm during this pause. Initially, three control variables PAUSE, RESTART and SYNCH1 are set equal to the values n, m and x respectively, as shown in step 305, where n and x could, for example, represent a certain number of MAC frames. The value m, however, represents a number of time intervals, wherein each time interval could, for example, correspond to the time interval associated with a single MAC frame. In accordance with step 310, once the control variables PAUSE, RESTART and SYNCH1 are initialized, the base station transmits, in the downlink portion of the current MAC frame, a control message indicating that after the next n number of MAC frames, the base station and the corresponding wireless terminals will pause (i.e., halt all transmissions). The control variable PAUSE is then decremented by 1, as shown in step 315, and, in accordance with decision step 320, a determination is made as to whether the control variable PAUSE is equal to zero. If, in accordance with the NO path out of decision step 320, the control variable PAUSE is not yet equal to zero, the base station broadcasts another control message in the next MAC frame. This control message indicates that after the next n-I data frames, the base station and the corresponding wireless terminals will pause so that the base station can make the necessary interference measurements. It will be understood that this continues until the control variable PAUSE equals zero (i.e., after n number of MAC frames).

When the control variable PAUSE equals zero, in accordance with the YES path out of decision step 320, all transmissions in the broadcast region are halted, as indicated in step 325, and the base station begins taking interference measurements, is indicated in step 330. The control variable RESTART is then decremented by 1, in accordance with step 335, wherein the control variable RESTART represents the time remaining in the pause period during which the base station is able to make interference measurements. Next, a determination is made as to whether the control variable RESTART is equal to zero, as shown in decision step 340. If the control variable is not equal to zero, in accordance with the NO path out of decision step 340, then a time interval associated with a single MAC frame is allowed to elapse and the control variable RESTART is once again decremented by 1. During the time period that the control variable RESTART is being decremented from the value m to the value of zero, the base station continues to make interference measurements. However, once the control variable RESTART equals zero, in accordance with the YES path out of decision step 340, thus signifying the end of the pause in transmissions, the base station terminates the taking of interference measurements as illustrated in step 345.

The technique illustrated in FIG. 3 then transitions to a synchronization period, during which x number of empty MAC frames are generated (i.e., MAC frames that contain no user data) over the original frequency f. The purpose of this is to give the wireless terminals a period of time to resynchronize with the base station and the generation of MAC frames before the base station begins retransmitting user data. Accordingly, a first empty MAC frame is generated over the original frequency f, as illustrated in step 350. The control variable SYNCH1 is then decremented by 1, as shown in step 355. A determination is then made as to whether the control variable SYNCH1 is equal to zero, as shown in decision step 360. If the control variable SYNCH1 is not yet equal to zero, in accordance with the NO path out of decision step 360, another empty MAC frame is generated as shown in step 350. It will be understood that empty MAC frames will continue to be generated until the control variable SYNCH1 equals zero, in accordance with the YES path out of decision step 360, thus signifying the end of the synchronization period. Then, in accordance with step 365, the next MAC frame generated over the original frequency f will contain user data.

The purpose of the technique illustrated in FIG. 3 is to provide a period of time during which the base station can make the interference measurements needed to support automatic frequency assignment. However, in accordance with the MAC protocol of the present invention, a technique similar to that which is illustrate in FIG. 3 may be employed, wherein this second technique facilitates the automatic frequency assignment process itself by allowing the base station to inform the corresponding wireless terminals that the presently assigned frequency is to be exchanged for another frequency, and by allowing the wireless terminals a period of time to synchronize with the base station and the MAC frames being generated over the newly assigned frequency. This second technique is illustrated in FIG. 4.

Figure 4:
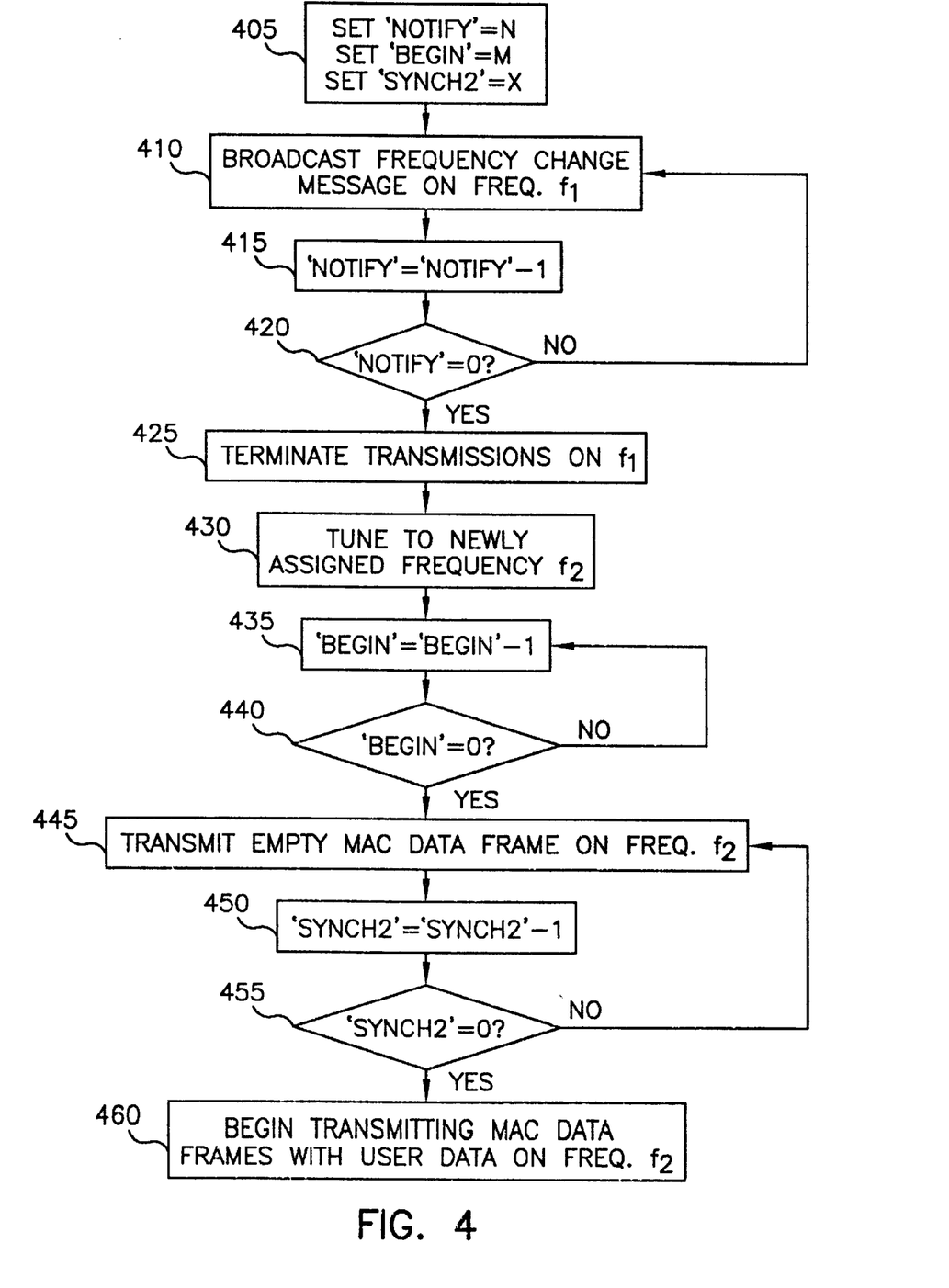
FIG. 4 is a flow diagram depicting a technique that facilitates automatic frequency assignment in a wireless local area network that employs a medium access control protocol, in accordance with the present invention.

The technique illustrated in FIG. 4 also begins with the initialization of a number of control variables. More specifically, step 405 indicates that the control variables NOTIFY, BEGIN and SYNCH2 are initially set equal to the values N, M and X respectively, where N and X could, for example, represent a number of MAC frames. The value M, however, represents a number of time intervals, wherein each time interval could, for example, correspond to the time interval associated with a single MAC frame. In accordance with step 410, once the control variables NOTIFY, BEGIN and SYNCH2 are initialized the base station transmits a control message indicating that after the next N number of MAC frames, the base station and the corresponding wireless terminals will pause (i.e., halt all transmissions). The base station transmits this control message on a present frequency $f_1$, during the downlink portion of the current MAC frame. The control variable NOTIFY is then decremented by 1, as shown in step 415. In accordance with decision step 420, a determination is then made as to the control variable NOTIFY is equal to zero. If, in accordance with the NO path out of decision step 420, the control variable NOTIFY is not yet equal to zero, the base station broadcasts another control message on the present frequency $f_1$, during the downlink portion of the next MAC frame. This control message indicates that after the next N-1 MAC frames, the base station and the corresponding wireless terminals will pause (i.e., halt transmissions) for the purpose executing an automatic frequency assignment procedure. It will be understood that this continues until the control variable NOTIFY equals zero (i.e., after N number of MAC frames containing a control message warning the wireless terminals of the automatic frequency assignment and the impending pause in transmissions).

When the control variable NOTIFY is equal to zero, in accordance with the YES path out of decision step 420, all transmissions in the broadcast region are halted, as indicated in step 425. At this point, the base station begins tuning to a new frequency $f_2$, as illustrated in step 430, wherein the new frequency $f_2$ has been assigned to the base station by the automatic frequency assignment algorithm. The control variable BEGIN is then decremented by 1, in accordance with step 435, wherein the control variable BEGIN represents the remaining time that the base station has for tuning to the newly assigned frequency $f_2$. Next, a determination is made as to whether the control variable BEGIN is equal to zero, as shown in decision step 440. If the control variable BEGIN is not equal to zero, in accordance with the NO path out of decision step 440, then a time interval associated with a single MAC frame is allowed to elapse and the control variable BEGIN is once again decremented by 1. During the time period that the control variable BEGIN is decremented from the value M to the value of zero, the base station continues to tune itself to the new frequency $f_2$. However, once the control variable BEGIN equals zero, in accordance with the YES path out of decision step 440, the base station should be tuned to the newly assigned frequency $f_2$.

The technique illustrated in FIG. 4, like the technique illustrated in FIG. 3, then transitions to a synchronization period, during which X number of empty MAC frames are generated (i.e., MAC frames that contain no user data). However, unlike the technique illustrated in FIG. 3, the empty MAC frames are generated over the newly assigned frequency $f_2$. The purpose of this is to give the wireless terminals a period of time to synchronize themselves with the base station and the generation of MAC frames over the new frequency $f_2$, before the base station begins transmitting user data on the new frequency $f_2$. Accordingly, a first empty MAC frame is generated over the newly assigned frequency $f_2$, as illustrated in step 445. The control variable SYNCH2 is then decremented by 1, as shown in step 450. A determination is then made as to whether the control variable SYNCH2 is equal to zero, as shown in decision step 455. If the control variable SYNCH2 is not yet equal to zero, in accordance with the NO path out of decision step 455, another empty MAC frame is generated over the newly assigned frequency $f_2$, as shown in step 445. It will be understood that empty MAC frames will continue to be generated over the newly assigned frequency $f_2$ until the control variable SYNCH2 equals zero, in accordance with the YES path out of decision step 455, thus signifying the end of the synchronization period. Then, in accordance with step 460, the next MAC frame generated over the newly assigned frequency $f_2$ will contain user data.

The present invention has been described with reference to exemplary embodiments. However, it will be readily apparent to those skilled in the art that it is possible to embody the invention in specific forms other than as described above without departing from the spirit of the invention. The embodiments described above are illustrative and should not be considered restrictive in any way. The scope of the invention is given by the appended claims, rather than the preceding description, and all variations and equivalents which fall within the range of the claims are intended to be embraced therein.

What is claimed is:

1. A medium access control (MAC) protocol for use in a wireless telecommunications network that includes a base station and a wireless terminal, said medium access control protocol comprising:

means for generating MAC frames over a first frequency, wherein the MAC frames contain telecommunications data and control information being transmitted between the base station and the wireless terminal;

means for generating a control message from the base station to the wireless terminal in a downlink portion of a MAC frame indicating that the base station and the wireless terminal will be prevented from transmitting following the generation of a first number of MAC frames;

after the generation of the first number of MAC frames, means for preventing the base station and the wireless terminal from transmitting during a predefined time interval;

means for generating a second number of MAC frames after the expiration of the predefined time interval, wherein the MAC frames contain no user data, and wherein the wireless terminal resynchronizes with the base station while the second number of MAC frames are generated; and means for resuming the generation of MAC frames containing telecommunications data and control information following the generation of the predetermined number of empty MAC frames.

2. The MAC protocol of claim 1 wherein the base station makes interference measurements for at least one frequency during the predefined time interval.

3. The MAC protocol of claim 2 wherein said means for generating the second number of MAC frames after the expiration of the predefined time interval comprises:

means for generating the second number of empty MAC frames on the first frequency.

4. The MAC protocol of claim 2 wherein said means for resuming the generation of MAC frames containing telecommunications data and control information following the generation of the second number of empty MAC frames comprises:

means for generating the MAC frames containing telecommunications data and control information over the first frequency.

5. The MAC protocol of claim 1 wherein the base station tunes to a second frequency during the predefined time interval, wherein the second frequency is a newly assigned frequency.

6. The MAC protocol of claim 5 wherein said means for generating the second number of MAC frames after the expiration of the predefined time interval comprises:

means for generating the second number of empty MAC frames on the second frequency.

7. The MAC protocol of claim 5 wherein said means for resuming the generation of MAC frames containing telecommunications data and control information following the generation of the second number of empty MAC frames comprises:

means for generating the second number of empty MAC frames containing telecommunications data and control information over the second frequency.

8. The MAC protocol of claim 5 wherein the second frequency was assigned to the base station by an automatic frequency assignment algorithm.

9. A method for accomplishing automatic frequency assignment in a wireless telecommunications network that includes a base station and a wireless terminal, wherein the base station and the wireless terminal communicate in accordance with a medium access control (MAC) protocol, said method comprising the steps of:

generating MAC frames over a first frequency, wherein the MAC frames contain telecommunications data and control information being transmitted between the base station and the wireless terminal;

generating a control message from the base station to the wireless terminal in a downlink portion of a MAC frame indicating that the base station and the wireless terminal will be prevented from transmitting following the generation of a first number of MAC frames;

determining whether the first number of MAC frames has been generated;

after the first number of MAC frames has been generated, preventing the base station and the wireless terminal from transmitting during a predefined time interval;

generating a second number of MAC frames after the expiration of the predefined time interval, wherein the MAC frames contain no user data, and wherein the wireless terminal resynchronizes with the base station while the second number of MAC frames are generated;

determining whether the second number of empty MAC frames has been generated; and after the second number of empty MAC frames has been generated, resuming the generation of MAC frames containing telecommunications data and control information.

10. The method of claim 9 further comprising the step of:

performing interference measurements at the base station for at least one frequency during the predefined time interval.

11. The method of claim 10 wherein said step of generating the second number of MAC frames after the expiration of the predefined time interval comprises the step of:

generating the second number of empty MAC frames on the first frequency.

12. The method of claim 10 wherein said step of resuming the generation of MAC frames containing telecommunications data and control information following the generation of the second number of empty MAC frames comprises the step of:

generating the second number of empty MAC frames containing telecommunications data and control information on the first frequency.

13. The method of claim 9 further comprising the step of:

tuning the base station to a second frequency during the predefined time interval, wherein the second frequency is a newly assigned frequency.

14. The method of claim 13 wherein said step of generating the second number of empty MAC frames after the expiration of the predefined time interval comprises the step of:

generating the second number of empty MAC frames on the second frequency.

15. The method of claim 13 wherein said step of resuming the generation of MAC frames containing telecommunications data and control information following the generation of the second number of empty MAC frames comprises the step of:

generating the second number of empty MAC frames containing telecommunications data and control information over the second frequency.

16. The method of claim 13 wherein the second frequency was assigned to the base station by an automatic frequency assignment algorithm.

17. A method for automatic frequency assignment in a wireless local area network that includes a base station and at least one wireless terminal, wherein the base station and the at least one wireless terminal communicate in accordance with a medium access control (MAC) protocol, said method comprises the steps of:

generating MAC frames over a first frequency, wherein the MAC frames contain telecommunications data and control information being transmitted between the base station and the at least one wireless terminal;

broadcasting an interference measurement pause control message from the base station to the at least one wireless terminal in a downlink portion of a MAC frame, wherein the interference measurement pause control message warns the at least one wireless terminal that following the generation of a first number of MAC frames the base station will begin making interference measurements for at least one frequency;

determining whether the first number of MAC frames has been generated;

after determining that the first number of MAC frames has been generated, terminating all base station and wireless terminal transmissions for a predefined time interval;

at the base station, measuring interference for the at least one frequency during the predefined time interval;

determining whether the predefined time interval has elapsed;

after determining that the predefined time interval has elapsed, terminating the interference measurements being made at the base station and generating a second number of MAC frames, wherein each of the second number of MAC frames contains no user data;

synchronizing the at least one wireless terminal with the base station while the second number of MAC frames are being generated;

determining whether all of the second number of empty MAC frames have been generated;

after determining that all of the second number of empty MAC frames have been generated, resuming the generation of MAC frames containing telecommunications data and control information over the first frequency; and assigning a new frequency to the base station in place of the first frequency, based on the interference measurements.

18. The method of claim 17 wherein said step of assigning the new frequency to the base station comprises the steps of:

broadcasting a frequency exchange control message from the base station to the at least one wireless terminal in a downlink portion of a MAC frame, wherein the frequency exchange control message warns the at least one wireless terminal that following the generation of a third number of MAC frames the base station will begin tuning to the newly assigned frequency;

determining whether the third number of MAC frames has been generated;

after determining that the third number of MAC frames has been generated, terminating all base station and wireless terminal transmissions for a second predefined time interval;

tuning the base station to the newly assigned frequency during the second predefined time interval;

after determining that the predefined time interval has elapsed, generating a fourth number of MAC frames on the newly assigned frequency, wherein each of the fourth number of MAC frames contains no user data;

synchronizing the at least one wireless terminal with the base station while the fourth number of MAC frames are being generated;

after determining that all of the fourth number of empty MAC frames have been generated, resuming the generation of MAC frames containing telecommunications data and control information over the newly assigned frequency.

19. The method of claim 18 wherein the wireless local area network is a High Performance Local Area Network Type Two.

20. The method of claim 19 wherein the at least one wireless terminals are fixed computer terminals.

21. The method of claim 19 wherein the at least one wireless terminals are laptop computer terminals.

* * * * *